United States Patent
Liang et al.

(10) Patent No.: US 10,816,867 B2
(45) Date of Patent: Oct. 27, 2020

(54) DISPLAY PANEL AND DRIVING METHOD THEREOF

(71) Applicant: CONCORD (HK) INTERNATIONAL EDUCATION LIMITED, Wan Chai (CN)

(72) Inventors: Pengxia Liang, Beijing (CN); Ken Wen, Beijing (CN); Jing Yu, Beijing (CN)

(73) Assignee: CONCORD (HK) INTERNATIONAL EDUCATION LIMITED, Wan Chai (HK)

( * ) Notice: Subject to any disclaimer, the term of this patent is extended or adjusted under 35 U.S.C. 154(b) by 333 days.

(21) Appl. No.: 15/720,135

(22) Filed: Sep. 29, 2017

(65) Prior Publication Data
US 2018/0088435 A1 Mar. 29, 2018

(30) Foreign Application Priority Data
Sep. 29, 2016 (CN) .......................... 2016 1 0866854

(51) Int. Cl.
*G02F 1/1335* (2006.01)
*G02F 1/17* (2019.01)
(Continued)

(52) U.S. Cl.
CPC ........ *G02F 1/167* (2013.01); *G02F 1/133553* (2013.01); *G02F 1/172* (2013.01);
(Continued)

(58) Field of Classification Search
CPC ............. G02F 1/1335; G02F 1/133502; G02F 1/133504; G02F 1/133509; G02F 1/133512; G02F 1/133514; G02F 1/167; G02F 1/133553; G02F 1/172; G02F 2001/133562; G02F 2203/023; G02F 1/1676; G02F 1/134309; G02F 1/00; G02F 1/166;
(Continued)

(56) References Cited

U.S. PATENT DOCUMENTS

2006/0125776 A1* 6/2006 Togano ................... G02F 1/167
345/107
2008/0024430 A1* 1/2008 Roh ........................ G02F 1/167
345/107
(Continued)

*Primary Examiner* — William R Alexander
*Assistant Examiner* — Alberto J Betancourt
(74) *Attorney, Agent, or Firm* — Zhong Lun Law Firm LLP

(57) ABSTRACT

A display panel, including first and second substrates assembled into a cell, a transparent medium provided therebetween, and charged light-absorbing particles mixed in the transparent medium. The first substrate includes a first base body and a total internal reflection structure, and a refractive index of the transparent medium is smaller than each of refractive indexes of the total internal reflection structure and the light-absorbing particles. Each pixel unit of the display panel is provided with plural electrode walls therein, the plural electrode walls in each pixel unit include first and second electrode walls. In a direction parallel to the display panel, the first electrode walls and the second electrode walls are provided alternately and wall surfaces thereof are opposite to each other, and electrode walls arranged opposite to each other are provided with a part of the total internal reflection structure therebetween.

16 Claims, 1 Drawing Sheet

(51) Int. Cl.
*G02F 1/1676* (2019.01)
*G02F 1/167* (2019.01)

(52) U.S. Cl.
CPC .............. *G02F 1/1676* (2019.01); *G02F 2001/133562* (2013.01); *G02F 2203/023* (2013.01)

(58) Field of Classification Search
CPC ..... G02F 1/16761; G02F 2001/134318; G02F 1/134327; G02F 1/134336; G02F 2001/134345; G02F 2001/134354; G02F 1/134363; G02F 2001/134372; G02F 2001/134381; G02B 5/02–0294; G09G 3/344
USPC .... 359/237–238, 290, 296; 345/107, 84–87; 430/32; 349/155–156
See application file for complete search history.

(56) References Cited

U.S. PATENT DOCUMENTS

| | | | | |
|---|---|---|---|---|
| 2008/0024432 A1* | 1/2008 | Lee | ............... | G02F 1/167 |
| | | | | 345/107 |
| 2010/0172016 A1* | 7/2010 | Park | ............... | G02F 1/167 |
| | | | | 359/296 |
| 2016/0246155 A1* | 8/2016 | Loxley | ............... | G02F 1/167 |
| 2019/0049814 A1* | 2/2019 | Whitehead | ............... | G02F 1/167 |

* cited by examiner

DISPLAY PANEL AND DRIVING METHOD THEREOF

CROSS-REFERENCE TO RELATED APPLICATIONS

The present application claims the priority of Chinese Patent Application No. 201610866854.7, filed on Sep. 29, 2016, the contents of which are incorporated herein in their entirety by reference.

TECHNICAL FIELD

The present disclosure relates to the field of electronic ink display technology, and in particular, relates to a display panel and a driving method thereof.

BACKGROUND

In a conventional display panel which realizes displaying of a bright state and a dark state by means of total internal reflection of light, an electric field for controlling light-absorbing particles (i.e., ink particles) to move is nonuniform, resulting in nonuniform distribution of the light-absorbing particles. Thus, a defect of light leakage is prone to occur. Further, the display panel has a complicated structure, and thus is difficult to manufacture.

Therefore, it is desired to provide a display panel, which realizes displaying of a bright state and a dark state by means of total internal reflection of light, is easy to manufacture, and reduces or prevents light leakage.

SUMMARY

To at least partially solve the problems of nonuniform electric field and great difficulty in preparing an electrode existing in a conventional electronic ink display panel, embodiments of the present disclosure provide a display panel, which can generate a uniform electric field and is easy to manufacture, and a driving method thereof.

Some embodiments of the present disclosure provide a display panel, which includes a first substrate and a second substrate which are aligned and assembled into a cell, wherein the first substrate includes a first base body and a total internal reflection structure provided on a side of the first base body facing to the second substrate, the display panel further includes a transparent medium provided between the first substrate and the second substrate and charged light-absorbing particles mixed in the transparent medium, a refractive index of the transparent medium is smaller than each of a refractive index of the total internal reflection structure and a refractive index of the light-absorbing particles; and the display panel further includes a plurality of pixel units, each of which is provided with a plurality of electrode walls therein, the plurality of electrode walls in each of the pixel units include a first electrode wall and a second electrode wall, in a direction parallel to the display panel, a wall surface of each first electrode wall and a wall surface of at least one second electrode wall are arranged opposite to each other and are provided with a part of the total internal reflection structure therebetween, and a wall surface of each second electrode wall and a wall surface of at least one first electrode wall are arranged opposite to each other and are provided with a part of the total internal reflection structure therebetween.

In an embodiment, the total internal reflection structure includes a plurality of hemisphere microstructures protruding towards the second substrate, and the part of the total internal reflection structure is one of the plurality of hemisphere microstructures.

In an embodiment, each of the pixel units includes more than one hemisphere microstructure of the hemisphere microstructures, and at least two opposite sides of each of the hemisphere microstructures are provided with one first electrode wall and one second electrode wall, respectively.

In an embodiment, any two adjacent ones of the hemisphere microstructures are provided with a spacer therebetween, and one first electrode wall and one second electrode wall are provided at a position of the spacer.

In an embodiment, the first electrode wall and the second electrode wall are provided on the second substrate.

In an embodiment, the second substrate includes a reflecting layer.

In an embodiment, any two of the electrode walls, which are arranged adjacent to each other and do not have a part of the total internal reflection structure therebetween, have an insulating dielectric layer filled therebetween.

In an embodiment, the refractive index of the light-absorbing particles is equal to or greater than the refractive index of the total internal reflection structure.

In an embodiment, each of the light-absorbing particles has a black color.

In an embodiment, each of the first base body and the total internal reflection structure is made of a transparent material.

In an embodiment, the transparent medium is a dispersion liquid, the light-absorbing particles are dispersed in the dispersion liquid, and are movable in the dispersion liquid under control of an electric field.

In an embodiment, the reflecting layer is provided between the second substrate and the plurality of electrode walls.

In an embodiment, the reflecting layer is provided at a side of the second substrate far away from the first substrate.

Some embodiments of the present disclosure provide a driving method of the display panel according to the present disclosure, the driving method includes steps of:

when any one of the pixel units is to enter into a bright state, applying a first driving voltage across corresponding first and second electrode walls which are opposite to each other, such that the light-absorbing particles are located at the first electrode wall and/or the second electrode wall; and when any one of the pixel units is to enter into a dark state, applying a second driving voltage across corresponding first and second electrode walls which are opposite to each other, such that the light-absorbing particles are located at the part of the total internal reflection structure in the pixel unit.

In an embodiment, the first driving voltage is a voltage for providing each of the first and second electrode walls with charges, a type of which is different from that of charges of the light-absorbing particles, or a voltage for providing one of the first and second electrode walls with charges, a type of which, is the same as that of charges of the light-absorbing particles while providing the other of the first and second electrode walls with charges, a type of which is different from that of charges of the light-absorbing particles; and the second driving voltage is a voltage for providing each of the first and second electrode walls with charges, a type of which is the same as that of the charges of the light-absorbing particles.

In an embodiment, when the pixel unit is to be maintained in the bright state, cancelling application of the first driving voltage across the corresponding first and second electrode walls; and when the pixel unit is to be maintained in the dark state, cancelling application of the second driving voltage across the corresponding first and second electrode walls.

DETAILED DESCRIPTION

Figure 1:
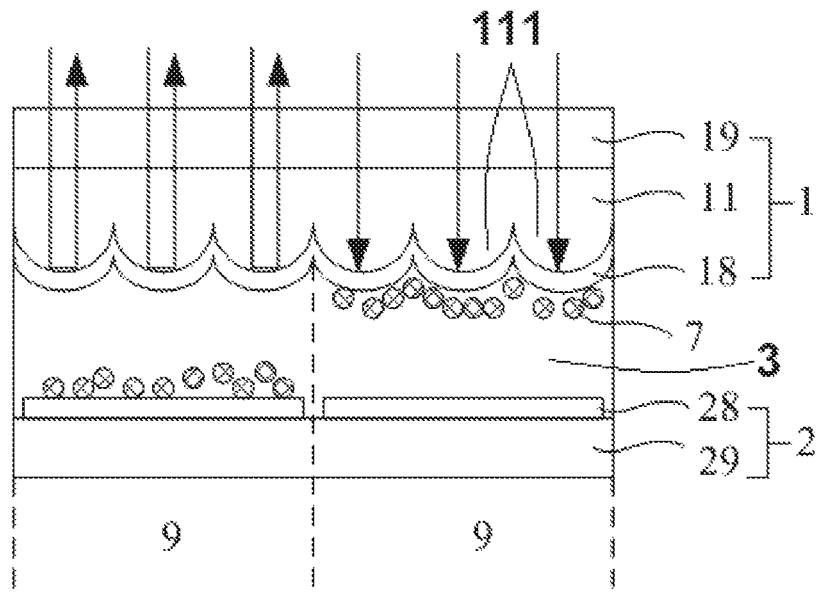
FIG. 1 is a schematic diagram showing a structure of a display panel according to embodiments of the present disclosure.

In order to make a person skilled in the art better understand the technical solutions of the present disclosure, the present disclosure will be described in detail below with reference to embodiments and the accompanying drawings. A same reference numeral or sign denotes a same component throughout the present disclosure.

In the present disclosure, the term "patterning process" refers to step(s) for forming a structure having a predetermined pattern, and may be a photolithography process. The photolithography process may include one or more of steps of: forming a material layer, coating a photoresist on the material layer, exposing, developing, and etching the photoresist, lifting off the remaining photoresist, and the like. Further, the "patterning process" may include other processes such as an imprinting process, an inkjet printing process, and the like.

Figure 2:
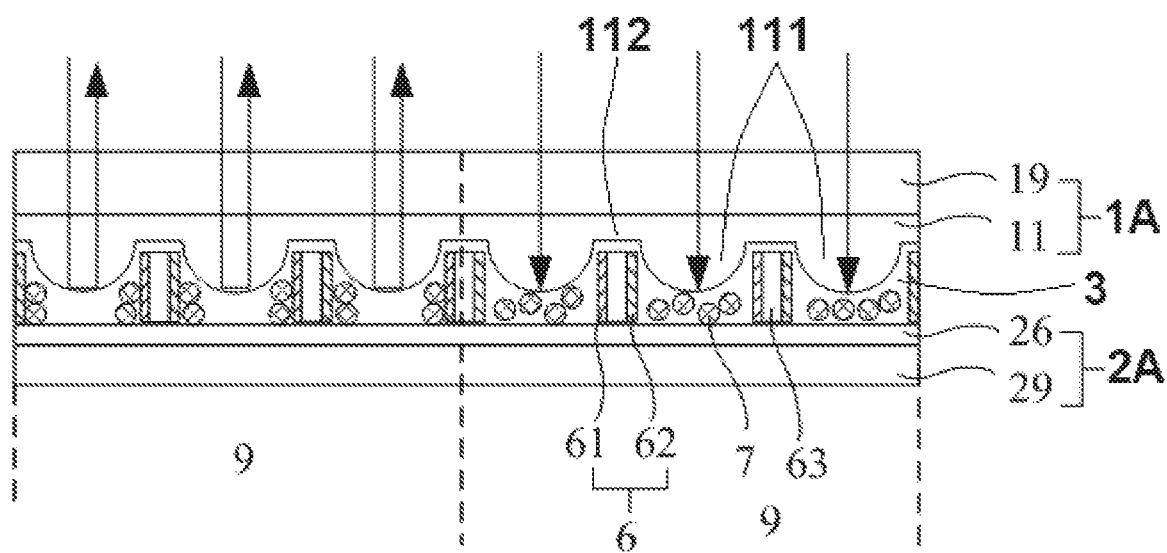
FIG. 2 is a schematic diagram showing a structure of another display panel according to embodiments of the present disclosure.

Some embodiments of the present disclosure provide an electronic ink display panel which realizes displaying of a bright state and a dark state by means of total internal reflection of light. As shown in FIG. 1, in the electronic ink display panel, a transparent medium 3 is filled between a first substrate 1 and a second substrate 2, and charged light-absorbing particles (i.e., ink particles) 7 are mixed in the transparent medium 3. A first base body 19 of the first substrate 1 is provided with a total internal reflection structure 11 facing to the transparent medium 3, and the total internal reflection structure 11 includes a plurality of hemisphere microstructures 111. Each of the hemisphere microstructures 111 is made of a resin having a large refractive index, and a first electrode 18 is provided on a surface, which faces to the transparent medium 3, of each of the hemisphere microstructures 111. The first electrode 18 may be a common electrode. A refractive index of each of the hemisphere microstructures 111 and a refractive index of the light-absorbing particles 7 are substantially the same, whereas the refractive index of each of the hemisphere microstructures 111 is greater than a refractive index of the transparent medium 3. The display panel may include a plurality of pixel units 9, each of which may correspond to one or more of the plurality of hemisphere microstructures 111. A plurality of second electrodes 28 are provided on a second base body 29 of the second substrate 2, and for example, each of the pixel units 9 is provided with one of the second electrodes 28 therein. Each of the second electrodes 28 may be a pixel electrode. By applying different driving voltages to the first electrode 18 and a corresponding second electrode 28, the light-absorbing particles 7 may be controlled to move between the first electrode 18 and the corresponding second electrode 28 or between the first substrate 1 and the second substrate 2. When the light-absorbing particles 7 move to a side of the second substrate 2, since the refractive index of each of the hemisphere microstructures 111 is greater than the refractive index of the transparent medium 3, at least a part of incident light entering from the outside into each of the hemisphere microstructures 111 will be subjected to total internal reflection at a boundary between each of the hemisphere microstructures 111 and the transparent medium 3, and will be reflected back, thereby realizing display of a bright state. When the light-absorbing particles 7 move to a side of the first substrate 1, each of the hemisphere microstructures 111 is close to (as shown in FIG. 1) or in contact with (as shown in FIG. 2) the light-absorbing particles 7. Since the refractive index of each of the hemisphere microstructures 111 and the refractive index of the light-absorbing particles 7 are substantially the same, the incident light will not subjected to total internal reflection, or a part of the incident light being subjected to total internal reflection will be reduced. Thus, all or most of the incident light will pass through the hemisphere microstructures 111 and will be absorbed by the light-absorbing particles 7, thereby realizing display of a dark state.

In an example, the transparent medium 3 may be a dispersion liquid, the charged light-absorbing particles 7 may be dispersed in the dispersion liquid, and may be movable in the dispersion liquid under control of an electric field. Each of the light-absorbing particles 7 may have a black color, so as to absorb light irradiating thereon, thereby realizing display of the dark state.

In an example, the first substrate 1 may be a front substrate of the display panel, and may be made of a transparent material. That is, the first base body 19, the total internal reflection structure 11 and the first electrode 18 may be made of a single transparent material, or may be made of different transparent materials, respectively. When the display panel operates, a user (or a viewer) views the information displayed on the display panel through the first substrate 1. The second substrate 2 may be a back substrate of the display panel.

Another embodiment of the present disclosure provides another display panel, as shown in FIG. 2. Compared with the display panel as shown in FIG. 1, the display panel according to the present embodiment can generate a more uniform electric field, thereby mitigating or preventing the phenomenon of light leakage. Further, the display panel according to the present embodiment is easier to manufacture. The display panel according to the present embodiment will be described in detail below.

The display panel according to the present embodiment includes a first substrate 1A and a second substrate 2A which are aligned and assembled into a cell. The first substrate 1A includes a first base body 19 and a total internal reflection structure 11 provided on a side of the first base body 19 facing to the second substrate 2A. The display panel further includes a transparent medium 3 provided between the first substrate 1A and the second substrate 3A. Charged light-absorbing particles are mixed in the transparent medium 3. A refractive index of the transparent medium 3 is smaller than each of a refractive index of the total internal reflection structure 11 and a refractive index of the light-absorbing particles 7. The refractive index of the light-absorbing particles 7 and that of the total internal reflection structure 11 are approximately identical, and for example, the refractive index of the light-absorbing particles 7 is equal to or greater than that of the total internal reflection structure 11.

The display panel further includes a plurality of pixel units 9, and each of the plurality of pixel units 9 is provided with a plurality of electrode walls 6 therein. The plurality of electrode walls 6 in each of the pixel units 9 include a first electrode wall 61 and a second electrode wall 62. Hereinafter, the first electrode wall 61 and the second electrode wall 62 will be collectively referred to as the electrode walls 6 in a case where distinguishing therebetween is not necessary. The total internal reflection structure 11 includes a plurality of hemisphere microstructures 111. In a direction parallel to the display panel (i.e., the horizontal direction, or a direction perpendicular to the stacking direction of the first and second substrates 1A and 2A, or a direction perpendicular to the thickness direction of the display panel, as shown in FIG. 2), a wall surface of each first electrode wall 61 and a wall surface of at least one second electrode wall 62 are arranged opposite to each other and are provided with a part of the total internal reflection structure 11 therebetween, and a wall surface of each second electrode wall 62 and a wall surface of at least one first electrode wall 61 are arranged opposite to each other and are provided with a part of the total internal reflection structure 11 therebetween. For example, in the direction parallel to the display panel (i.e., the horizontal direction as shown in FIG. 2), wall surfaces of one first electrode wall 61 and one second electrode wall 62 located at two sides of each of the hemisphere microstructures 111, respectively, are arranged opposite to each other and are provided with the hemisphere microstructure 111 of the total internal reflection structure 11 therebetween.

As shown in FIG. 2, the display panel according to the present embodiment does not include the first electrode 18 and the second electrode 28 as shown in FIG. 1, but includes the plurality of electrode walls 6. Each of the electrode walls 6 is an electrode having a form similar to a "wall" or "plate", and this electrode has a relative small width (in the horizontal direction) and a relative large height (in the vertical direction) in the sectional view of the display panel as shown in FIG. 2. Specifically, if a minimal size (i.e, a minimal width) of each of the electrode walls 6 in a plane parallel to the display panel is 1 (in any length unit), a size (i.e., height) of each of the electrode walls 6 in a direction perpendicular to the thickness direction of the display panel should be at least 2.5, preferably be equal to or greater than 3, more preferably be equal to or greater than 5, further preferably be equal to or greater than 10. As an example, each of the electrode walls 6 may be formed by a patterning process. For example, a conductive film with a relatively large width may be formed first, and then a photolithography process is performed thereon, so that the portion of the conductive film not belonging to the electrode walls 6 is removed, and the remaining portion of the conductive film forms the electrode walls 6.

The display panel may include a plurality of cells, each of which is a minimal point controllable independently and may be, for example, a pixel or a subpixel. Each of the cells may include one of the hemisphere microstructures 111, two of the electrode walls 6 located at two sides of said one of the hemisphere microstructures 111, and a portion of the transparent medium 3 and a portion of the light-absorbing particles 7 between said two of the electrode walls 6.

In other words, in the display panel according to the present embodiment, each of the pixel units 9 may include a plurality of cells. Each of the pixel units 9 is provided with at least one first electrode wall 61 and at least one second electrode wall 62. A wall surface of each first electrode wall 61 is opposite to a wall surface of at least one second electrode wall 62, and a wall surface of each second electrode wall 62 is opposite to a wall surface of at least one first electrode wall 61. One first electrode wall 61 and one second electrode wall 62 which are opposite to each other are provided with a part (e.g., one of the hemisphere microstructures 111) of the total internal reflection structure 11 therebetween. However, it is not necessary that all pairs of one first electrode wall 61 and one second electrode wall 62 which are opposite to each other are provided with a part of the total internal reflection structure 11 therebetween. For example, as shown in FIG. 2, one first electrode wall 61 and one second electrode wall 62, which correspond to each of spacers 112 of the total internal reflection structure 11, are not provided with a part of the total internal reflection structure 11 therebetween. Specifically, the wall surface of each of the electrode walls 6 (i.e., a plane defined by a length direction perpendicular to the section as shown in FIG. 2 and the height direction of each of the electrode walls 6, or a plane perpendicular to the section as shown in FIG. 2) is directly opposite to a wall surface of an adjacent electrode wall 6, and thus two adjacent electrode walls 6 can generate a parallel and uniform electric field therebetween. Each of the hemisphere microstructures 111 of the total internal reflection structure 11, a corresponding portion of the transparent medium 3, and a corresponding portion of the light-absorbing particles 7 are located between the wall surfaces of two opposite electrode walls 6.

In the display panel according to the present embodiment, when a certain pixel unit 9 is to enter into a bright state, a first predetermined driving voltage may be applied across the electrode walls 6 in the pixel unit 9, such that the light-absorbing particles 7 move to the electrode walls 6 therein. In this case, no light-absorbing particles 7 are located at the position of the total internal reflection structure 11 between the corresponding pair of electrode walls 6 (e.g., a position corresponding to a vertex of the corresponding hemisphere microstructures 111, or a central position between the corresponding pair of electrode walls 6). Since the refractive index of the total internal reflection structure 11 is greater than that of the transparent medium 3, at least a part of incident light may be subjected to total internal reflection at a surface of the total internal reflection structure 11 and be reflected back, thereby realizing display of the bright state. When a certain pixel unit 9 is to enter into a dark state, a second predetermined driving voltage may be applied to the electrode walls 6 in the pixel unit 9, such that the light-absorbing particles 7 move to the central position of the electrode walls 6 which are arranged opposite to each other. That is, the light-absorbing particles 7 are caused to be located at a position corresponding to the corresponding hemisphere microstructure 111 of the total internal reflection structure 11 and be in contact with the corresponding hemisphere microstructure 111 of the total internal reflection structure 11. Since the refractive index of the light-absorbing particles 7 is approximate to that of the total internal reflection structure 11 (preferably, the refractive index of the light-absorbing particles 7 is equal to or greater than that of the total internal reflection structure 11), in this case, total internal reflection of the incident light will not occur at a surface of the total internal reflection structure 11 or a part of the incident light being subjected to total internal reflection is reduced. Thus, all or most of the incident light will pass through the total internal reflection structure 11 and will be absorbed by the light-absorbing particles 7, thereby realizing display of the dark state.

The electrodes adopted in the display panel according to the present embodiment are in the form of electrode walls (i.e., flat plates) 6, and thus do not fluctuate with the accidented surface of the total internal reflection structure, making a preparation process thereof be simple. Further, the electrode walls 6 can generate a horizontal uniform electric field, which has a good effect for driving the light-absorbing particles 7.

In an embodiment, the total internal reflection structure 11 includes a plurality of hemisphere microstructures 111 protruding towards the second substrate 2A. Further, each of the pixel units 9 includes more than one hemisphere microstructure of the hemisphere microstructures 111, and at least two opposite sides of each of the hemisphere microstructures 111 are provided with one first electrode wall 61 and one second electrode wall 62, respectively.

That is, the total internal reflection structure 11 may include a plurality of hemisphere microstructures 111, which protrude towards the second substrate 2A. In general, as shown in FIG. 2, each of the pixel units 9 includes one or more of the hemisphere microstructures 111, based on limitations on the size, uniformity of outgoing light, and the like thereof. In this case, correspondingly, at least two opposite sides of each of the hemisphere microstructures 111 are provided with one first electrode wall 61 and one second electrode wall 62, respectively. In another example, four electrode walls 6 may be provided at respective sides of each of the hemisphere microstructures 111, respectively. As a result, when a dark state is being realized, the four electrode walls 6 around each of the hemisphere microstructures 111 may drive the light-absorbing particles 7 to a position corresponding to the vertex of the hemisphere microstructure 111, thereby achieving the best effect for preventing total internal reflection from occurring.

An arrangement of the first electrode walls 61 and the second electrode wall 62 may be various. For example, as shown in FIG. 2, one first electrode wall 61 and one second electrode wall 62 may form a "pair", and a part (i.e., a hemisphere microstructure 111) of the total internal reflection structure 11 may be provided therebetween. Thus, there exist some pairs of the first electrode wall 61 and the second electrode wall 62 arranged adjacent to each other without a part of the total internal reflection structure 11 provided therebetween. For example, one first electrode wall 61 and one second electrode wall 62 corresponding to each of the hemisphere microstructures 111 of the total internal reflection structure 11 do not have a part of the total internal reflection structure 11 provided therebetween. Alternatively, the first electrode walls 61 and the second electrode walls 62 may be arranged alternately, so that in a case where the hemisphere microstructures 111 are adjacent to each other (i.e., the spacers 112 are excluded), any two adjacent ones of the electrode walls 6, which are opposite to each other, are provided with one of the hemisphere microstructures 111 of the total internal reflection structure 11 therebetween.

In an example, as shown in FIG. 2, any two adjacent ones of the hemisphere microstructures 111 are provided with a spacer 112 therebetween, and a pair of one first electrode wall 61 and one second electrode wall 62 is provided at a position of the spacer 112.

It should be noted that, a material of the spacers 112 is the same as that of the hemisphere microstructures 111, and the spacers 112 are the portions of the total internal reflection structure 11 other than the hemisphere microstructures 111, as shown in FIG. 2.

That is, in this case, the hemisphere microstructures 111 of the total internal reflection structure 11 are not immediately adjacent to each other, and any two adjacent ones of the hemisphere microstructures 111 have a spacer 112 provided therebetween. As described above, a pair of electrode walls 6 are located at each of the spacers 112, so as to absorb the light-absorbing particles 7 to the spacer 112 when a bright state is being realized, thereby efficiently preventing the light-absorbing particles 7 from blocking respective hemisphere microstructures 111 of the total internal reflection structure 11. Further, to make distances between the substrates 1A and 2A at each of the electrode walls 6 be equal to each other, all of the electrode walls 6 may have a same height. Thus, a preparation process of the electrode walls 6 may be simplified.

In an example, the first electrode walls 61 and the second electrode walls 62 are provided on the second substrate 2A.

That is, the electrode walls 6 may be provided on a surface of the second substrate 2A, for example, on the second base body 29 (FIG. 2 shows an example that the electrode walls 6 are provided on the reflecting layer 26). For example, a pair of the electrode walls 6 at two sides of each of the hemisphere microstructures 111 may generate a horizontal uniform electric field, so as to cause the light-absorbing particles 7 to move to or away from positions of vertexes of the hemisphere microstructures 111. The positions of vertexes of the hemisphere microstructures 111 are positions close to a surface of the second substrate 2A. If the electrode walls 6 are provided on the second substrate 2A, a horizontal uniform electric field may be generated around the positions of vertexes of the hemisphere microstructures 111 even if a height of the electrode walls 6 is not large, thereby minimizing a thickness of the display panel.

Optionally, it is feasible to provide the electrode walls 6 on the first substrate 1A, or to provide one of the first electrode walls 61 and the second electrode walls 62 on the first substrate 1A while the other thereof on the second substrate 2A.

It should be noted that, since driving voltages may be applied across the first electrode walls 61 and the second electrode walls 62, a circuit for providing power thereto may be provided in the substrates 1A and/or 2A. To simplify a structure thereof, the first electrode walls 61 or the second electrode walls 62 may be common electrodes being provided with an identical common voltage, while the second electrode walls 62 or the first electrode walls 61 may be pixel electrodes being independent from each other and being provided with different data voltages in the pixel units 9.

In an example, the second substrate 2A includes a reflecting layer 26. The reflecting layer 26 may be located at a side of the second base body 29 close to the first substrate 1A, or may be at a side of the second base body 29 far away from the first substrate 1A in a case where the second base body 29 is made of a transparent material.

When a bright state is being realized, a small part of incident light will pass through the total internal reflection structure 11 and enter into the transparent medium 3. In this case, by providing the reflecting layer 26 on the second substrate 2A, light irradiating on the reflecting layer 26 will be reflected back, thereby increasing the brightness in the bright state. Further, by doing so, the second substrate 2A of the display panel will not allow light to be emitted outwards therefrom in any case, thereby improving the display effect.

In an example, at least some of the electrode walls 6, which are arranged adjacent to each other and do not have a part of the total internal reflection structure 11 therebetween (i.e., a pair of electrode walls 6 being located at each of the spacers 112), have an insulating dielectric layer 63 filled therebetween.

As shown in FIG. 2, to achieve better distribution of an electric field, there may be exist some adjacent (and opposite) electrode walls 6 (which may all be the first electrode walls 61, or may all be the second electrode walls 62, or may be the first electrode walls 61 and the second electrode walls 62) without any hemisphere microstructure 111 of the total internal reflection structure 11 provided therebetween, and these electrode walls 6 may have a dielectric layer made of an insulating material (i.e., the insulating dielectric layer 63) provided therebetween. The insulating dielectric layer 63 is provided between two electrode walls 6 corresponding to each of the spacers 112, so as to make the electrode walls 6 have a higher strength, thereby increasing the stability of the electrode walls 6, and facilitating preparation of the electrode walls 6. For example, the electrode walls 6 may be formed on a sidewall of the insulating dielectric layer 63. In an example, the insulating dielectric layer 63 itself may be formed by a patterning process.

Some embodiments of the present disclosure provide a driving method of the display panel according to the present disclosure, the driving method includes steps of:

when any one of the pixel units 9 is to enter into a bright state, applying a first driving voltage across a first electrode wall 61 and a corresponding second electrode wall 62 (which located at, for example, two sides of each hemisphere microstructure in this pixel unit 9), such that the light-absorbing particles 7 are located at the first electrode wall 61 and/or second electrode wall 62; and when any one of the pixel units 9 is to enter into a dark state, applying a second driving voltage across a first electrode wall 61 and a corresponding second electrode wall 62 (which located at, for example, two sides of each hemisphere microstructure in this pixel unit 9), such that the light-absorbing particles 7 are located at a position of the total internal reflection structure 11 in this pixel unit 9 (e.g., at the position of the corresponding hemisphere microstructure 111 of the total internal reflection structure 11).

That is, when a certain pixel unit 9 of the display panel is to enter into a bright state (e.g., switch from a dark state to a bright state, or enter into a bright state directly after starting up), a first driving voltage may be applied across the corresponding first electrode wall 61 and the corresponding second electrode wall 62, such that the light-absorbing particles 7 are absorbed on the electrode walls 6, and there no light-absorbing particle 7 at the position corresponding to the total internal reflection structure 11 (e.g., the position of the corresponding hemisphere microstructure 111). Thus, at least a part of incident light is subjected to total internal reflection.

When a certain pixel unit 9 of the display panel is to enter into a dark state (e.g., switch from a bright state to a dark state, or enter into a dark state directly after starting up), a second driving voltage may be applied across the corresponding first electrode wall 61 and the corresponding second electrode wall 62, such that the light-absorbing particles 7 are driven to the central position between the two electrode walls 6 which are arranged opposite to each other, i.e., are driven to the position corresponding to the total internal reflection structure 11 (e.g., the position of the corresponding hemisphere microstructure 111). Thus, the total internal reflection structure 11 and the light-absorbing particles 7 are caused to be in contact with each other, and incident light is prevented from being subjected to total internal reflection, or a part of the incident light being subjected to total internal reflection is reduced, thereby realizing display of the dark state.

In an example, the first driving voltage may be a voltage for providing each of the corresponding first and second electrode walls 61 and 62 with charges, a type of which is different from that of charges of the light-absorbing particles 7, or a voltage for providing one of the corresponding first and second electrode walls 61 and 62 with charges, a type of which is the same as that of charges of the light-absorbing particles 7 while providing the other of the corresponding first and second electrode walls 61 and 62 with charges, a type of which is different from that of charges of the light-absorbing particles 7. The second driving voltage is a voltage for providing each of the corresponding first and second electrode walls 61 and 62 with charges, a type of which is the same as that of the charges of the light-absorbing particles 7.

That is, as shown in FIG. 2, the first driving voltage may be a voltage which provides both of electrode walls 6 with charges, a type of which is opposite to the type of charges (positive charges or negative charges) of the light-absorbing particles 7, such that two opposite electrode walls 6 both attract the light-absorbing particles 7, and the light-absorbing particles 7 are absorbed to the two electrode walls 6, respectively. In this way, all of the electrode walls 6 in each of the pixel units 9 may be provided with a same type of charges, and no common electrode may be provided therein. Thus, only pixel electrodes are provided therein, i.e., the first electrode walls 61 and the second electrode walls 62 in each of the pixel units 9 are all pixel electrodes having a same voltage.

Alternatively, the first driving voltage may be a voltage which provides one of the first and second electrode walls 61 and 62 with charges, a type of which is the same as that of charges of the light-absorbing particles 7 while provides the other of the first and second electrode walls 61 and 62 with charges, a type of which is different from that of charges of the light-absorbing particles 7. In this way, of two opposite electrode walls 6, one repels the light-absorbing particles 7, and the other attracts the light-absorbing particles 7, thus the light-absorbing particles 7 therebetween are absorbed on one of the two electrode walls 6.

In an embodiment of the present disclosure, the first electrode wall 61 and the second electrode wall 62 may be formed by two preparation processes. Firstly, a film of the first electrode wall 61 is formed by magnetron sputtering, vapor deposition, chemical deposition, or the like, and then exposure and etching processes are performed to form a power supply line of the first electrode wall 61. Secondly, another film is deposited, exposed and etched to form the second electrode wall 62. Wiring and energizing of the first electrode wall 61 and the second electrode wall 62 are performed independently, so that the first electrode wall 61 and the second electrode wall 62 may be provided or charged with a same type of charges or with different types of charges. Alternatively, voltages with a same polarity may be applied to two adjacent first electrode wall 61 and second electrode wall 62, respectively, such that the two adjacent first electrode wall 61 and second electrode wall 62 are provided with a same type of charges. In a case where the two adjacent first electrode wall 61 and the second electrode wall 62 are provided with a same type of charges and said same type is identical to that of charges of the light-absorbing particles 7, the light-absorbing particles 7 are subjected to an electrostatic force and thus move to the central position between the first electrode wall 61 and the second electrode wall 62, thereby realizing display of the dark state.

The second driving voltage may be a voltage which provides the two electrode walls 6 with charges, a type of which is the same as that of the charges of the light-absorbing particles 7 (moreover, the charge amounts may also be identical). In this way, two opposite electrode walls 6 both repel the light-absorbing particles 7, so as to drive the light-absorbing particles 7 to the position corresponding to the hemisphere microstructure 111 of the total internal reflection structure 11 between the two electrode walls 6.

In an example, when the pixel unit 9 is to be maintained in the bright state, application of the first driving voltage across the corresponding first and second electrode walls 61 and 62 is cancelled. When the pixel unit 9 is to be maintained in the dark state, application of the second driving voltage across the corresponding first and second electrode walls 61 and 62 is cancelled.

In the present embodiment, the light-absorbing particles 7 may stably remain at an original position without a driving voltage. Thus, after a certain pixel unit 9 of the display panel enters into a certain state (e.g., a bright state), if it is to be maintained in that state for a period of time, it is not necessary to apply a voltage to the electrode walls 6 during the period of time, thereby reducing power consumption thereof.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A display panel, comprising a first substrate and a second substrate which are aligned and assembled into a cell, wherein the first substrate comprises a first base body and a total internal reflection structure provided on a side of the first base body facing to the second substrate, the display panel further comprises: a transparent medium provided between the first substrate and the second substrate and charged light-absorbing particles mixed in the transparent medium, a refractive index of the transparent medium is smaller than each of a refractive index of the total internal reflection structure and a refractive index of the light-absorbing particles; and the display panel further comprises: a plurality of pixel units, each of which is provided with a plurality of electrode walls therein, the plurality of electrode walls in each of the pixel units comprise: a first electrode wall and a second electrode wall, in a direction parallel to the display panel, a wall surface of each first electrode wall and a wall surface of at least one second electrode wall are arranged opposite to each other and are provided with a part of the total internal reflection structure therebetween, and a wall surface of each second electrode wall and a wall surface of at least one first electrode wall are arranged opposite to each other and are provided with a part of the total internal reflection structure therebetween, wherein each of the plurality of electrode walls has a height in a direction perpendicular to the display panel and a width in the direction parallel to the display panel, and a ratio of the height to the width is at least 2.5.

2. The display panel according to claim 1, wherein the total internal reflection structure comprises a plurality of hemisphere microstructures protruding towards the second substrate, and the part of the total internal reflection structure is one of the plurality of hemisphere microstructures.

3. The display panel according to claim 2, wherein each of the pixel units comprises more than one hemisphere microstructure of the hemisphere microstructures, and at least two opposite sides of each of the hemisphere microstructures are provided with one first electrode wall and one second electrode wall, respectively.

4. The display panel according to claim 3, wherein any two adjacent ones of the hemisphere microstructures are provided with a spacer therebetween, and one first electrode wall and one second electrode wall are provided at a position of the spacer.

5. The display panel according to claim 1, wherein the first electrode wall and the second electrode wall are provided on the second substrate.

6. The display panel according to claim 1, wherein the second substrate comprises a reflecting layer.

7. The display panel according to claim 1, wherein any two of the electrode walls, which are arranged adjacent to each other and do not have a part of the total internal reflection structure therebetween, have an insulating dielectric layer filled therebetween.

8. The display panel according to claim 1, wherein the refractive index of the light-absorbing particles is equal to or greater than the refractive index of the total internal reflection structure.

9. The display panel according to claim 1, wherein each of the light-absorbing particles has a black color.

10. The display panel according to claim 1, wherein each of the first base body and the total internal reflection structure is made of a transparent material.

11. The display panel according to claim 1, wherein the transparent medium is a dispersion liquid, the light-absorbing particles are dispersed in the dispersion liquid, and are movable in the dispersion liquid under control of an electric field.

12. The display panel according to claim 6, wherein the reflecting layer is provided between the second substrate and the plurality of electrode walls.

13. The display panel according to claim 6, wherein the reflecting layer is provided at a side of the second substrate far away from the first substrate.

14. A driving method of the display panel according to claim 1, comprising steps of:

when any one of the pixel units is to enter into a bright state, applying a first driving voltage across corresponding first and second electrode walls which are opposite to each other, such that the light-absorbing particles are located at the first electrode wall and/or the second electrode wall; and when any one of the pixel units is to enter into a dark state, applying a second driving voltage across corresponding first and second electrode walls which are opposite to each other, such that the light-absorbing particles are located at the part of the total internal reflection structure in the pixel unit.

15. The driving method according to claim 14, wherein, the first driving voltage is a voltage for providing each of the first and second electrode walls with charges, a type of which is different from that of charges of the light-absorbing particles, or a voltage for providing one of the first and second electrode walls with charges, a type of which is the same as that of charges of the light-absorbing particles while providing the other of the first and second electrode walls with charges, a type of which is different from that of charges of the light-absorbing particles; and the second driving voltage is a voltage for providing each of the first and second electrode walls with charges, a type of which is the same as that of the charges of the light-absorbing particles.

16. The driving method according to claim 14, wherein, when the pixel unit is to be maintained in the bright state, cancelling application of the first driving voltage across the corresponding first and second electrode walls; and when the pixel unit is to be maintained in the dark state, cancelling application of the second driving voltage across the corresponding first and second electrode walls.

* * * * *